US007774350B2

(12) United States Patent
Widjojo et al.

(10) Patent No.: US 7,774,350 B2
(45) Date of Patent: Aug. 10, 2010

(54) SYSTEM AND METHOD TO PROVIDE AND DISPLAY ENHANCED FEEDBACK IN AN ONLINE TRANSACTION PROCESSING ENVIRONMENT

(75) Inventors: Surjatini Widjojo, Los Gatos, CA (US); Nathan Sacco, San Jose, CA (US)

(73) Assignee: eBay Inc., San Jose, CA (US)

( * ) Notice: Subject to any disclaimer, the term of this patent is extended or adjusted under 35 U.S.C. 154(b) by 457 days.

(21) Appl. No.: 11/027,782

(22) Filed: Dec. 30, 2004

(65) Prior Publication Data

US 2005/0192958 A1    Sep. 1, 2005

Related U.S. Application Data

(60) Provisional application No. 60/548,526, filed on Feb. 26, 2004.

(51) Int. Cl.
  *G06F 7/00*      (2006.01)
  *G06F 17/00*     (2006.01)
  *G06F 9/44*      (2006.01)
  *G06F 17/50*     (2006.01)
  *G06Q 10/00*     (2006.01)

(52) U.S. Cl. ............... 707/752; 707/754; 707/999.005; 705/5; 705/7; 705/37

(58) Field of Classification Search ............ 705/7, 705/37; 707/5; 709/205
See application file for complete search history.

(56) References Cited

U.S. PATENT DOCUMENTS 5,285,496 A   2/1994  Frank et al.

| 5,583,763 A | 12/1996 | Atcheson et al. |
| 5,659,366 A | 8/1997 | Kerman |
| 5,669,877 A | 9/1997 | Blomquist |
| 5,678,041 A | 10/1997 | Baker et al. |
| 5,706,493 A | 1/1998 | Sheppard, II |
| 5,706,507 A | 1/1998 | Schloss |
| 5,708,829 A | 1/1998 | Kadashevich et al. |
| 5,732,954 A | 3/1998 | Strickler et al. |

(Continued)

OTHER PUBLICATIONS

Cynthia G. McDonald & V. Carlos Slawson, 2002. "Reputation in An Internet Auction Market," Economic Inquiry, Oxford University Press, vol. 40(4), pp. 633-650 (renumbered pp. 1-18), October.*

(Continued)

*Primary Examiner*—Khanh B Pham
*Assistant Examiner*—Ann J Chempakaseril
(74) *Attorney, Agent, or Firm*—Schwegman, Lundberg & Woessner, P.A.

(57) ABSTRACT

The present invention is a system for and method to collect, calculate, and display user feedback ratings in an online transaction processing (OLTP) environment. The invention utilizes a client, a network, a Web site host system, and rule-based decision making, to 1) enable users and other systems to submit transaction performance information for a buyer or seller; 2) enable users to view transaction performance information; and 3) enable users to view detailed transaction performance measures for buyers or sellers within specific performance categories. Rating the transaction performance of users of an OLTP environment can serve to improve users' trust in the OLTP environment, improve the reputation of online trading venues, and increase the value of these venues.

24 Claims, 9 Drawing Sheets

U.S. PATENT DOCUMENTS

| | | | |
|---|---|---|---|
| 5,737,479 A | 4/1998 | Fujinami |
| 5,754,939 A | 5/1998 | Herz et al. |
| 5,774,121 A | 6/1998 | Stiegler |
| 5,778,135 A | 7/1998 | Otteson et al. |
| 5,781,246 A | 7/1998 | Alten et al. |
| 5,787,253 A | 7/1998 | McCreery et al. |
| 5,790,426 A | 8/1998 | Robinson |
| 5,793,027 A | 8/1998 | Baik |
| 5,799,304 A | 8/1998 | Miller |
| 5,809,482 A | 9/1998 | Strisower |
| 5,810,771 A | 9/1998 | Blomquist |
| 5,822,123 A | 10/1998 | Davis et al. |
| 5,828,419 A | 10/1998 | Bruette et al. |
| 5,830,068 A | 11/1998 | Brenner et al. |
| 5,832,472 A | 11/1998 | Sheppard, II |
| 5,845,266 A | 12/1998 | Lupien et al. |
| 5,848,396 A | 12/1998 | Gerace |
| 5,862,230 A | 1/1999 | Darby |
| 5,867,799 A | 2/1999 | Lang et al. |
| 5,870,744 A | 2/1999 | Sprague |
| 5,872,850 A | 2/1999 | Klein et al. |
| 5,970,469 A | 10/1999 | Scroggie et al. |
| 6,112,186 A | 8/2000 | Bergh et al. |
| 6,134,548 A | 10/2000 | Gottsman |
| 6,327,574 B1 | 12/2001 | Kramer et al. |
| 6,352,479 B1 | 3/2002 | Sparks, II |
| 6,484,153 B1 | 11/2002 | Walker et al. |
| 6,697,824 B1 | 2/2004 | Bowman-Amuah |
| 7,124,112 B1 | 10/2006 | Guyan et al. |
| 7,428,505 B1 | 9/2008 | Levy et al. |
| 2001/0032170 A1* | 10/2001 | Sheth ........................ 705/37 |
| 2003/0055898 A1* | 3/2003 | Yeager et al. .............. 709/205 |
| 2004/0205013 A1* | 10/2004 | DeLaCruz ................. 705/37 |
| 2005/0125340 A1 | 6/2005 | Lin et al. |
| 2005/0144052 A1* | 6/2005 | Harding et al. ............ 705/7 |
| 2005/0261919 A1 | 11/2005 | Kundtz et al. |
| 2005/0289039 A1 | 12/2005 | Greak |
| 2006/0064343 A1 | 3/2006 | Burke et al. |
| 2006/0149745 A1 | 7/2006 | Mengerink |
| 2007/0005564 A1 | 1/2007 | Zehner |
| 2007/0038506 A1 | 2/2007 | Noble et al. |

OTHER PUBLICATIONS

Chicago Tribune, "Amazon.com expands into toys, electronics", *Chicago Tribune*, (Jul. 14, 1999),3;1.

Guglielmo, Connie , "BizRate Lets Consumers Rate Sites", *Interactive Week*, 4(22), (Aug. 4, 1997).

MTB Review, "http://www.mtbr.com", http://www.mtbr.com, The attached mtbr.pdf which includes screen shots from a Mountain Biking Resource Review web site taken from the Wayback Machine Internet Archive located at http://www.archive.org/web/web.php. ,(Archived Jan. 25, 1997).

Wolverton, Troy , "Productopia launches product review site", CNET News.com, (Jul. 21, 1999).

U.S. Appl. No. 11/241,008, Preliminary Amendment mailed Dec. 8, 2005, 3 pgs.

"U.S. Appl. No. 11/241,008 Non Final Office Action Mailed Oct. 7, 2009", 16 pgs.

U.S. Appl. No. 11/241,008, Response filed Jan. 7, 2010 to Non Final Office Action mailed Oct. 7, 2009, 15 pgs.

* cited by examiner

SYSTEM AND METHOD TO PROVIDE AND DISPLAY ENHANCED FEEDBACK IN AN ONLINE TRANSACTION PROCESSING ENVIRONMENT

RELATED APPLICATION

This application is a non-provisional application claiming benefit under 35 U.S.C. §119(e) of U.S. Provisional Application No. 60/548,526, filed Feb. 26, 2004, the contents of which are incorporated herein by reference.

FIELD OF THE INVENTION

The present invention relates generally to the technical field of commerce automation and, in one exemplary embodiment, to methods and systems to provide and display enhanced feedback in an online transaction processing (OLTP) environment.

BACKGROUND OF THE INVENTION

The advent of the Internet and the World Wide Web combined with the development of OLTP applications has enabled companies to transact business globally in real time. It is desirable that trading parties within an OLTP environment have sufficient knoweldge concerning the historical trading reputation of their trading partners. Insufficient reputation information can lead to users' reluctance to engage in transactions due to a lack of trust between trading partners. Current methods of providing and displaying reputation information in OLTP environments rely on gross measures of user ratings, typically a numerical ranking from one to three (corresponding to a trading reputation of best to worst). While this method provides some important information, users are in need of increasingly detailed reputation information as a way to ensure that the transactions will transpire successfully, especially as the value of transactions reaches into the hundreds and thousands of dollars. Also, users may need to focus only on specific information concerning a trading partner's reputation, such as how rapidly a buyer sends payment for an item or how rapidly a seller responds to communication attempts. Users may also require aggregate reputation information that ranks users across several performance parameters.

Further, the growth of service trading within the OLTP environment has necessitated a technique for users to provide feedback on how well the service was performed, whether it was performed in a timely fashion, etc.

Although some tracking of users' transaction performance ratings is presently conducted in select OLTP environments, some important technical hurdles have stood in the way of providing detailed customer feedback ratings. For example, the collection of transaction feedback data has historically been difficult because an OLTP environment may provide only the venue for trading, and may not be directly involved in the transaction once a product or service has been purchased. This has necessitated the development of data collection and data tracking capabilities beyond those normally available. Other technical challenges have included the need to develop a means for sorting and processing large amounts of feedback data using database structures and mathematical algorithms, as well as a means for displaying user transaction performance data in a format that is easily interpreted.

Some methods for providing and displaying user comments in online environments are known in the industry. For example, U.S. Pat. No. 6,094,675, "Electronic discussion system for exchanging information among users," assigned to Hitachi, Ltd. (Tokyo, JP), describes an electronic discussion system of the client/server structure for an electronic exchange of messages that are presented by a plurality of users and shown on a display of a client computer, wherein the servers comprise at least one storage server for holding detailed contents of respective pieces of opinion information, and at least one discussion server for holding opinion indexes showing the storage locations of opinion contents of respective pieces of opinion information, wherein the clients comprise an opinion writing client for transferring and writing the opinion index created from a newly presented piece of opinion information and the opinion content into the discussion server and the storage server, and a reading client for referring to opinion indexes and opinion contents recorded and managed in the discussion server and the storage server.

However, the '675 patent does not provide a method for submitting or displaying user transaction performance ratings in an online trading environment, nor does it allow the provision or display of detailed user reputation information grouped by performance categories. Therefore, what is needed is a system for and method of providing and displaying enhanced feedback in an OLTP environment.

SUMMARY OF THE INVENTION

According to one aspect of the present invention, there is provided a system and method to facilitate computer-based commerce. In one exemplary embodiment, the system includes a feedback collection module. The feedback collection module enables the system to receive feedback information responsive to completion of a transaction in an online transaction processing environment. The feedback information may be related to one or more performance categories. The system further includes a feedback score generator to generate feedback score utilizing the feedback information, and a display module to enable a second user to access the feedback score. The feedback collection module can collect feedback information from local and remote systems.

Other features of the present invention will be apparent from the accompanying drawings and from the detailed description, which follows.

BRIEF DESCRIPTION OF THE DRAWINGS

The present invention is illustrated by way of example and not limited in the figures of the accompanying drawings, in which like references indicate similar elements and in which.

DETAILED DESCRIPTION

A method and apparatus for providing and displaying enhanced feedback in an OLTP environment are described. In the following description, for purposes of explanation, numerous specific details are set forth in order to provide a thorough understanding of the present invention. It will be evident, however, to one skilled in the art that the present invention may be practiced without these specific details.

Platform Architecture

Figure 1:
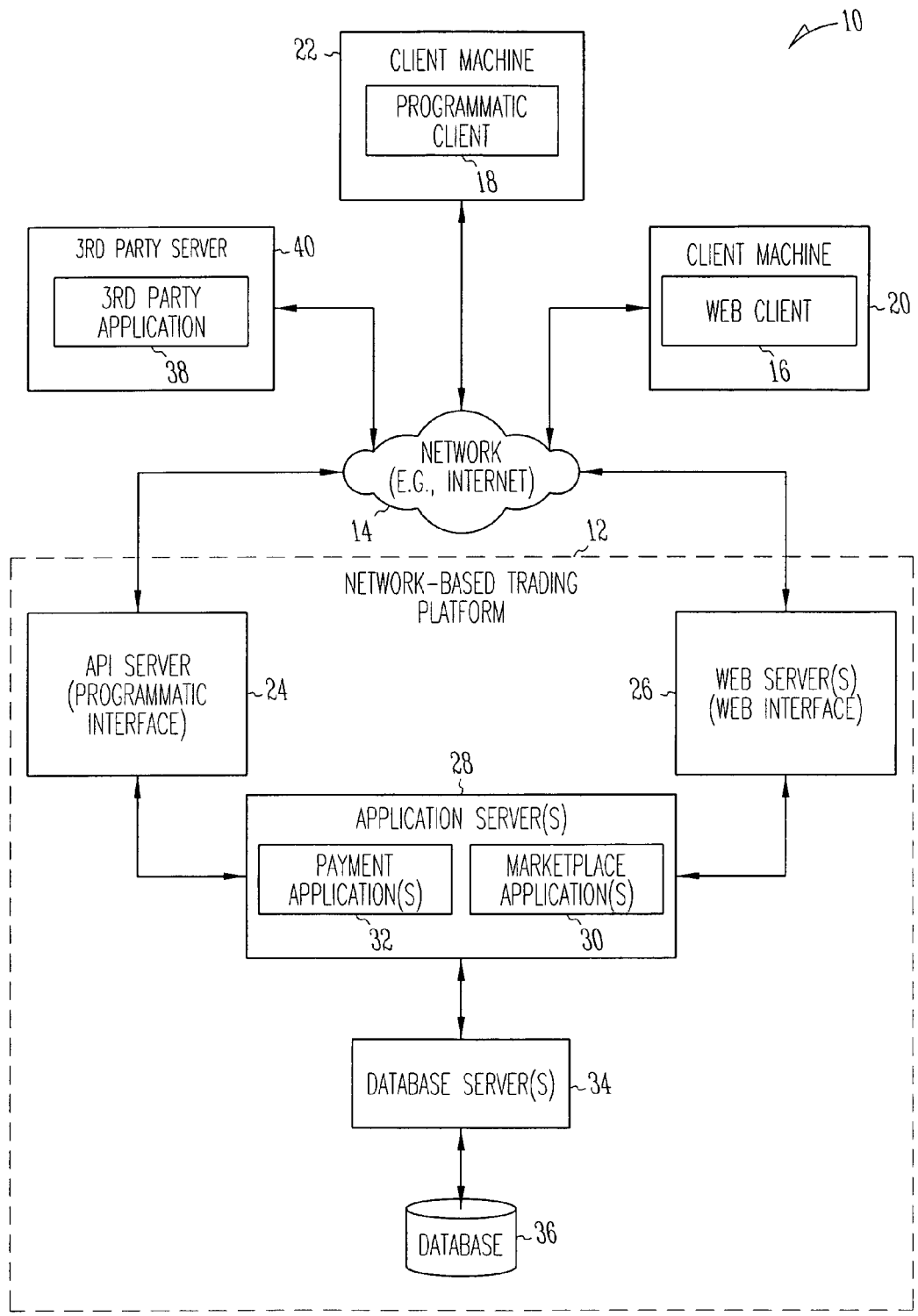
FIG. 1 is a network diagram depicting a system having a client-server architecture, according to one exemplary embodiment of the present invention.

FIG. 1 is a network diagram depicting an online transaction processing (OLTP) system 10, according to one exemplary embodiment of the present invention, having a client-server architecture. A commerce platform, in the exemplary form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Washington State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the OLTP system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 2:
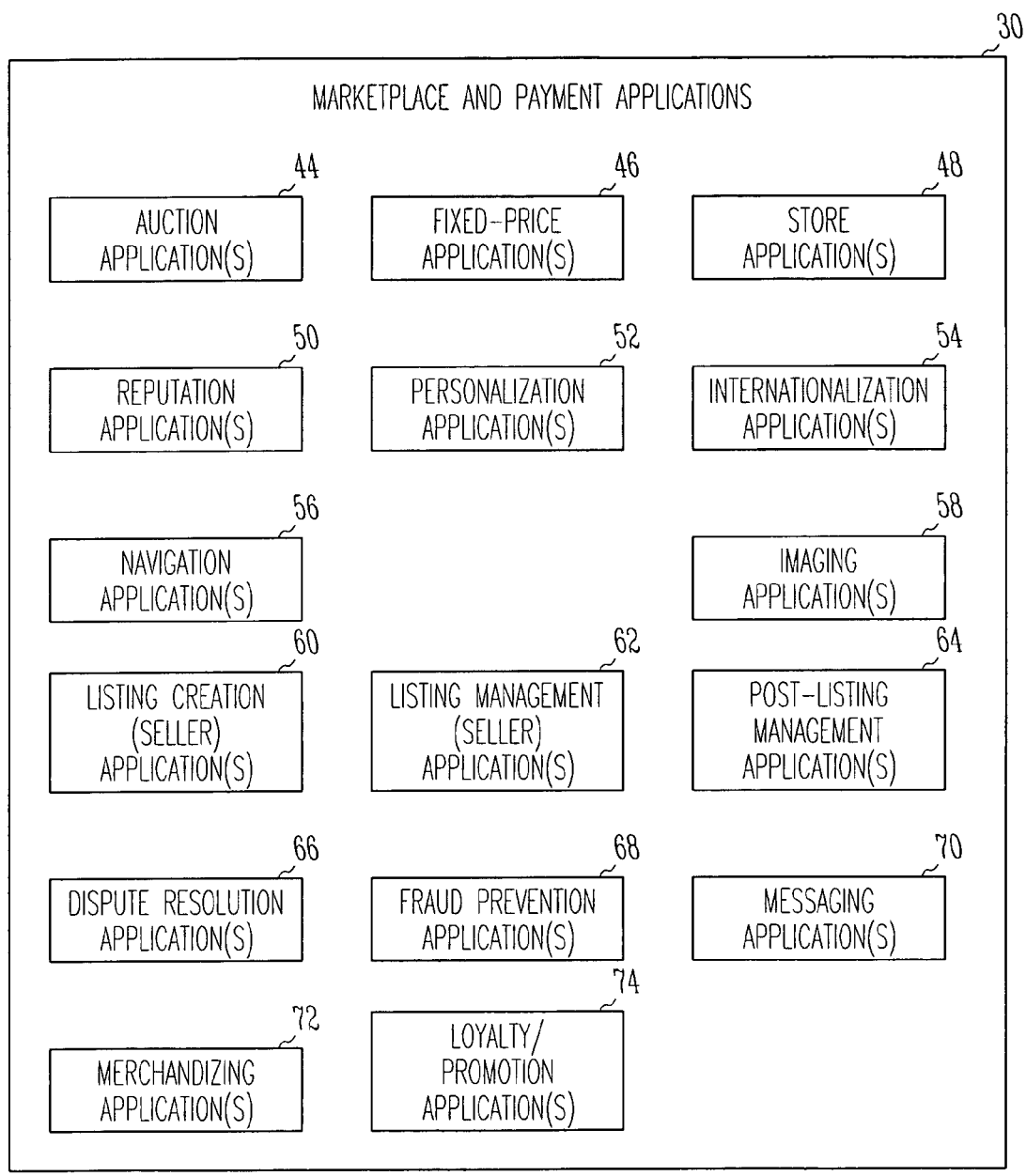
FIG. 2 is a block diagram illustrating marketplace and payment applications according to one exemplary embodiment of the present invention.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. Accordingly, one or more internationalization applications 54 may be provided. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., autorelisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Figure 3:
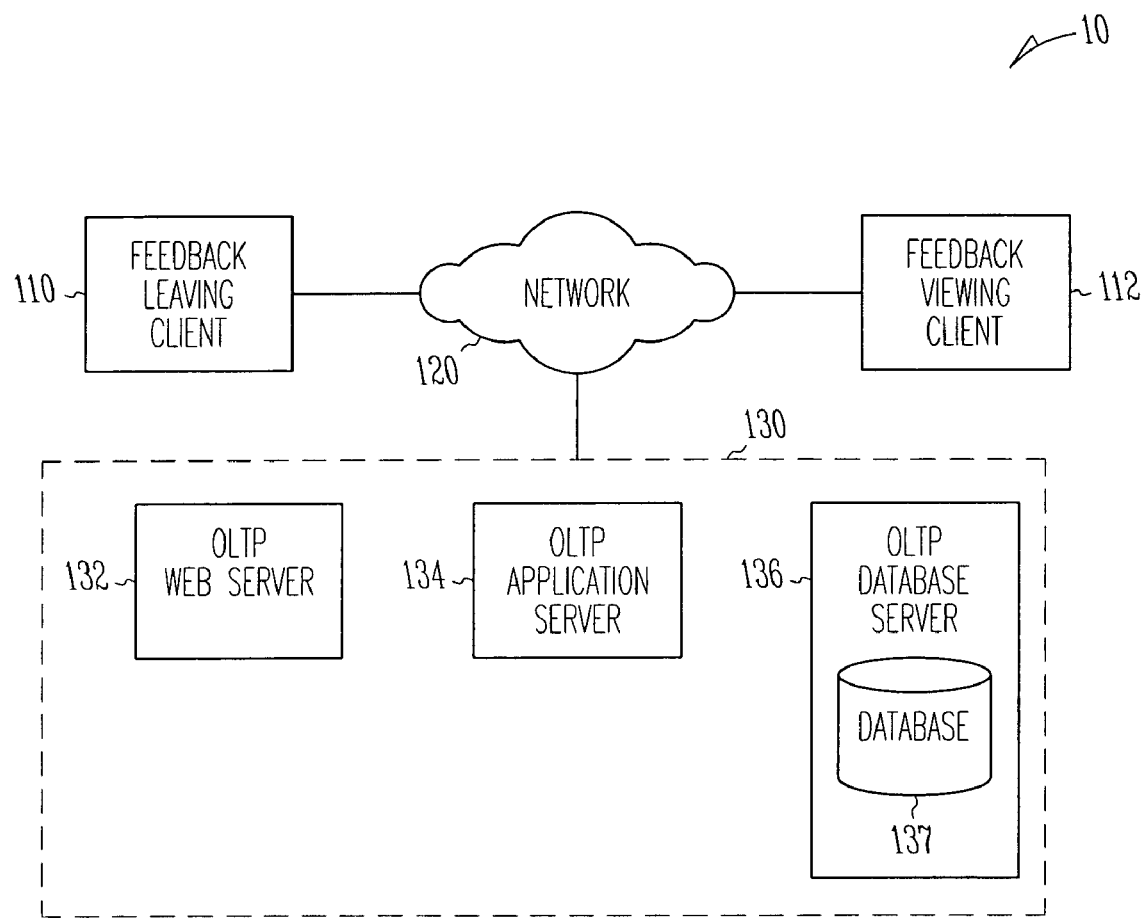
FIG. 3 is a block diagram illustrating an online transaction system for providing and displaying enhanced feedback in an OLTP environment according to one embodiment of the present invention.

FIG. 3 illustrates a simplified view of the online transaction processing (OLTP) system 10, with specific focus on the provision and display of enhanced feedback in an OLTP environment. The OLTP system 10 includes a feedback leaving client 110, a feedback viewing client 112, a network 120, and an OLTP Web site host 130, which further includes an OLTP Web server 132, an OLTP application server 134, and an OLTP database server 136. Further, OLTP database server 136 includes a database 137.

Feedback leaving client 110 is a computer system that enables a user who wants to leave feedback to interact with the OLTP system 10. Feedback viewing client 112 is a computer system that enables a user who wants to view feedback to interact with the OLTP system 10. Network 120 is a communications network, such as a LAN, WAN, intranet or the Internet. OLTP Web site host 130 is a system for hosting an OLTP Web site, such as an online auction or trading Web site. OLTP Web server 132 is a computer system that provides World Wide Web services, for example, to deliver Web pages using a markup language. OLTP application server 134 is a computer system that provides support for whatever functions are required by OLTP Web site host 130, such as receiving and processing transaction requests received by OLTP Web site host 130. OLTP database server 136 is a computer system that stores and maintains tables or other data structures within database 137 according to the specific architectural needs of the methods of the present invention, as described below. OLTP Web site host 130 comprises one or more servers, which may be physically co-located or distributed in a distributed computing architecture.

In operation, a user who wishes to leave feedback operates Web browser software, such as Internet Explorer or Netscape Navigator, on feedback leaving client 110 to navigate from feedback leaving client 110 via network 120 to OLTP Web site host 130. OLTP application server 134 receives a request to leave feedback from feedback leaving client 110, processes the requests by storing feedback information to database 137 within OLTP database server 136, and transmits a response back to feedback leaving client 110 via network 120.

Likewise, a user who wishes to view feedback operates Web browser software, such as Internet Explorer or Netscape Navigator, on feedback viewing client 112 to navigate from feedback viewing client 112 via network 120 to OLTP Web site host 130. OLTP application server 134 receives a request to view feedback from feedback viewing client 112, processes the requests by retrieving feedback information from database 137 within OLTP database server 136, and transmits feedback information back to feedback viewing client 112 via network 120.

In an alternative embodiment, feedback leaving client 110 and feedback viewing client 112 are the same computer system.

Figure 4:
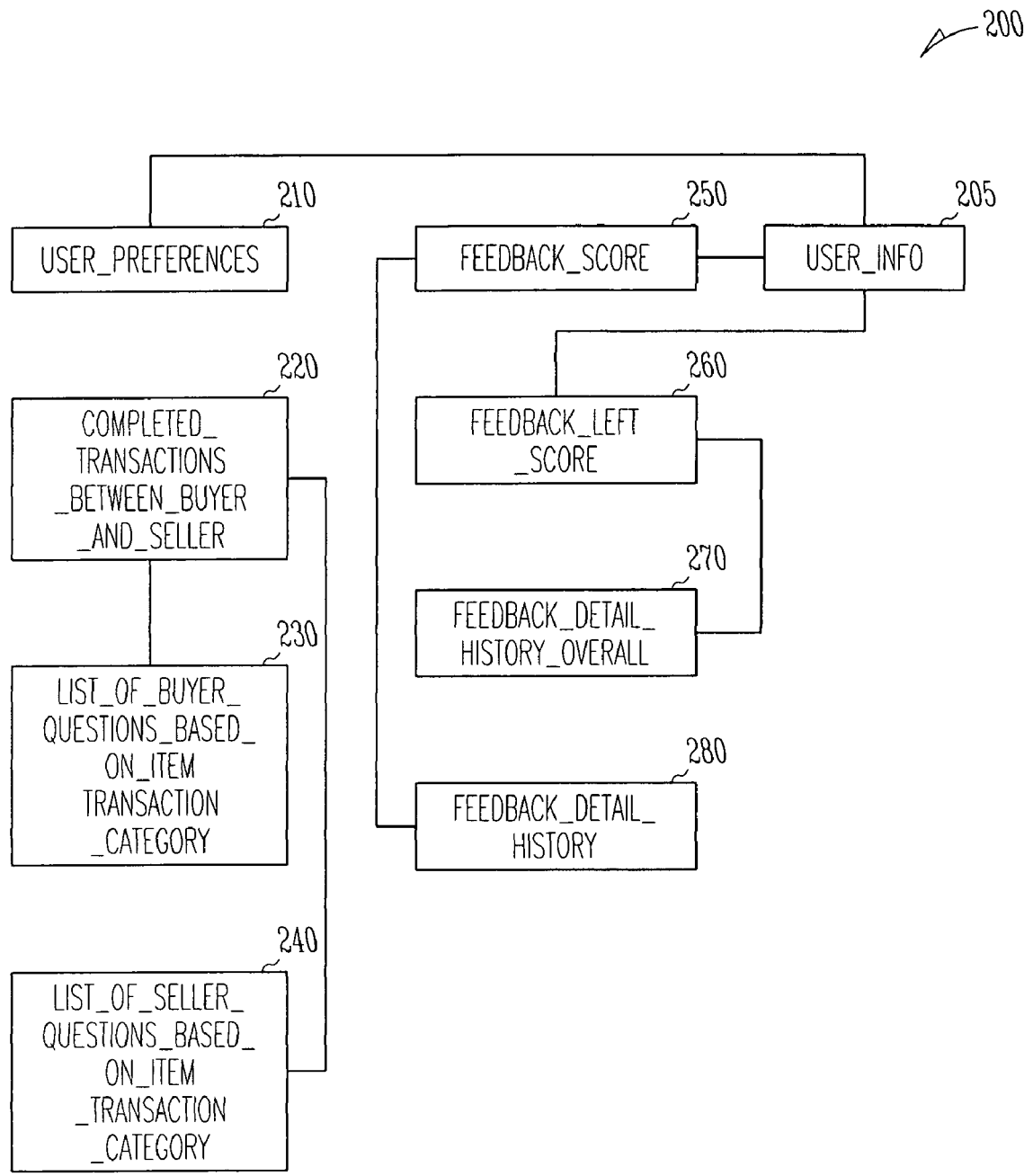
FIG. 4 is a block diagram illustrating enhanced feedback data structure according to one exemplary embodiment of the present invention.

FIG. 4 illustrates an enhanced feedback database structure 200 that is maintained and accessed by OLTP database server 136. Enhanced feedback database structure 200 corresponds to database 137 described in FIG. 4 and includes exemplary tables "User Information" 205, "User Preferences" 210, "Completed Transactions Between Buyer and Seller" 220, "List Of Buyer Questions Based On Item Transaction Category" 230, "List of Seller Questions Based On Item Transaction Category" 240, "Feedback Score" 250, "Feedback Left Score" 260, "Feedback Detail History Overall" 270, and "Feedback Detail History" 280. In one exemplary embodiment, the "Completed Transactions Between Buyer and Seller" tables 220 includes comprehensive details of the transaction.

A "User Information" table 205 is associated with "User Preferences" table 210. An active user usually has a set of completed transactions either as a buyer or seller. Information related to completed transactions is stored in "Completed Transactions Between Buyer and Seller" table 220. The transaction may have the item number being transacted and transaction category. Based on the category, there may be an associated list of detailed questions for the buyer stored in the "List Of Buyer Questions Based On Item Transaction Category" 230. There may also be an associated list of detailed questions for the seller stored in the "List Of Seller Questions Based On Item Transaction Category" 240. Upon completion of a transaction, each party to the transaction (e.g., the buyer and the seller) are requested to leave feedback regarding the quality of performance by the opposite party. In one exemplary embodiment of the present invention, the buyer is presented with the list of questions according to the user's status as a buyer. The questions presented may also be generated according to the transaction category. The feedback in the form of an overall performance rating and in the form of responses to individual questions is gathered and stored. The overall performance information is stored in the raw "Feedback Detail History Overall" 270 as an evaluation of the buyer's overall experience with respect to the transaction (e.g., positive/negative/neutral/not available). The detailed answers to the questions are stored in the "Feedback Detail History" 280. These answers may be aggregated and summed into the "Feedback Score" 250 associated with the buyer as well as into the "Feedback Left Score" 260 for easier lookup without extensive calculations. Similarly, the seller is presented with the list of questions according to the user's status as a seller, and the feedback regarding the completed transaction is obtained and processed according to the technique described above. The questions presented may also be generated according a transaction category and may vary based on the information or data automatically collected. For example, if information regarding when payments were made or items shipped was obtained from a payment or shipping partners then a question such as "Was payment timely?" need not be asked.

It will be appreciated that feedback data or information may be sourced from one or more local and/or remote information systems and need not be limited to information that is entered in response to the questions asked of a transacting party (e.g., buyer or seller). For example, a feedback information could be obtained from local or remote payment applications 32 or a transaction processing facility (e.g., to PayPal, an eBay, Inc. company located in San Jose Calif.) to find out when a particular transaction was paid. The information may be obtained, for example, by way of a call out. Alternatively, the local or remote payment applications 32 or a transaction processing facility could push this information into the system 10. In one exemplary embodiment, this information may be used to determine how many days or hours after the listing closed that the buyer paid. Accordingly, an average payment time may be displayed as part of the buyer's reputation information.

The OLTP Web site host 130 may be configured to enable the user to view reputation information (e.g., feedback) with respect to another user. The user may request to view the reputation information associated with the opposite transacting party. Alternatively, the user may be presented with the relevant reputation information associated with the opposite transacting party responsive to the user's request to enter into a transaction with another user. The overall view may be provided to the user according to the requesting user's preferences stored in "User Preferences" 210. A view of associated reputation information is then retrieved from the feedback score table stored in "Feedback Score" 250 and the feedbackleft score table stored in "Feedback Left Score" 260. If the user desires details, then the details may be presented (e.g., in paginated format) utilizing "Feedback Detail History Overall" 270 and "Feedback Detail History" 280. The user may be enabled selectively to access reputation information according to criteria such as promptness of payment information, quality of performance information, timeliness of performance information, or promptness of response information as well as according to other criteria. Other criteria may be, but not limited to, shipping, packaging, item accurately described, promptness of leaving feedback, was the item returned by the buyer, was there a non-payment, when was the item received, etc.

Figure 5:
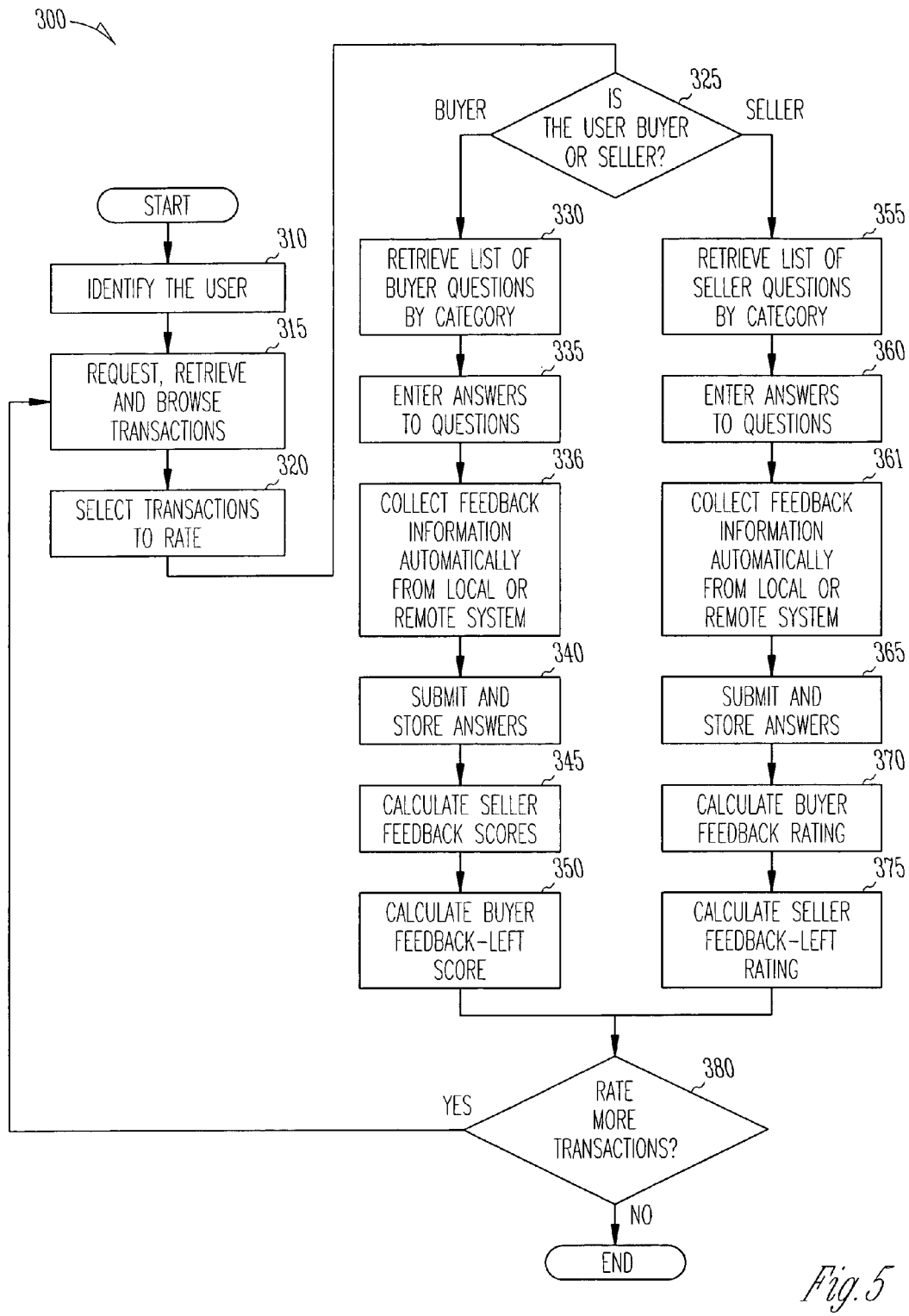
FIG. 5 is a flow chart illustrating a method of inputting and calculating transaction performance ratings according to one exemplary embodiment of the present invention.

FIG. 5 illustrates a method 300 of inputting and calculating transaction performance ratings, according to one exemplary embodiment of the present invention, including the operations of:

Operation 310: Identifying User

In this operation, the user ID and password is obtained via feedback leaving client 110, which transmits this information to OLTP Web site host 130 via network 120. An OLTP application server 134 or an OLTP Web server 132 receives and authenticates the user ID and password, and grants the user access to the OLTP environment. Alternatively, the user may not explicitly provide his or her identifying information but may be identified by OLTP Web site host 130 through, for example, information stored in a user cookie stored in feedback leaving client 110.

Operation 315: Requesting, Retrieving and Browsing Transactions

In this operation, the user makes a request via feedback leaving client 110 to view a list of all or a subset of his or her transactions that have been performed within the OLTP environment. The request is transmitted by feedback leaving client 110 via network 120 to OLTP Web site host 130, where OLTP application server 134 receives the request. OLTP application server 134 retrieves a list of the requested transactions from "Completed Transactions Between Buyer and Seller" 220 within enhanced feedback database structure 200, and transmits the list to feedback leaving client 110, where it is displayed to the user. The user then browses through the list of transactions, of which there may be multiple pages.

An example of a transaction is buyer "A" purchasing an item (goods and/or services) from seller "B." Once a transaction is completed, a record of it is added to the transaction list, where it can be retrieved and viewed along with the feedback information obtained from the transaction participants and any associated systems.

Operation 320: Selecting Transactions to Rate

In this operation, the user, via feedback leaving client 110, selects one or more transactions from the transaction list displayed in operation 315. The selected transactions are those for which the user wishes to provide transaction performance information, e.g., a rating of the transaction. Feedback leaving client 110 transmits the selections to OLTP Web site host 130 via network 120, where OLTP application server 134 receives them.

Operation 325: Is User the Buyer or Seller?

In this decision operation, OLTP application server 134 retrieves the transactions selected in operation 320 from OLTP database server 136 and determines whether the user making the request is a buyer or seller for each selected transaction. The determination of whether the user is a buyer or seller is made based on information stored within the transaction information, e.g., based on whether the user is the buyer or seller within a transaction. If the user is a buyer for a selected transaction, method 300 proceeds to operation 330. If the user is a seller for a selected transaction, method 300 proceeds to operation 355.

Operation 330: Retrieving List of Buyer Questions by Category

In this operation, OLTP application server 134 retrieves from "List Of Buyer Questions Based On Item Transaction Category" 230 within enhanced feedback database structure 200 a list of buyer feedback rating questions pertaining to the transactions selected in operation 320, transmits the list in a feedback rating form to feedback leaving client 110 via network 120, where it is presented to the user. The presented feedback questions may differ depending on the item type (e.g., product or service) involved in the selected transaction and the amount of transaction related data or information that was automatically collected by the system 10. However, some feedback rating questions may remain the same across all item types, e.g., questions concerning the accuracy of item descriptions.

TABLE 1

Exemplary buyer feedback rating performance categories and questions for a buyer in an OLTP environment.

| Performance Category | Example Questions |
| --- | --- |
| Communication/Customer Service | Is seller prompt and clear in his/her communication? |
| | Is seller clear on his/her return policies? |
| Item/Service Purchased | Is item as described? |
| | Are you satisfied with the item/service? |
| | Would you buy/use the item/service again? |
| Shipping/Handling | Did seller ship the item promptly after payment was received? |
| | Are seller's shipping/handling fees reasonable? |
| | Are you happy with the item packaging? |

The feedback rating form presents feedback rating questions to the user grouped according to performance categories and varying based on the transaction data or information automatically collected by the system 10. That is, the user may, for example, be presented with three questions regarding shipping and handling, two questions regarding the accuracy of the item description, and four questions regarding how quickly the seller responded to communications. Table 1 shows a listing of exemplary feedback rating performance categories and questions for the buyer. The form may also provide a comment field that enables the buyer to enter a customized message regarding the seller or choose a message from a list of prepared messages.

Operation 335: Entering Answers to Questions

In this operation, the user via feedback leaving client 110 answers the questions posed on the feedback rating form displayed in operation 330. The user's answers to feedback rating questions may take the form of subjective answers such as positive, negative, neutral, not applicable. For each of the example questions shown in Table 1, the buyer may answer yes, no, neutral, or not applicable. Examples of methods the user might use to select the appropriate answer include: (1) entering a number that corresponds to the appropriate answer; (2) choosing a radio button that corresponds to the appropriate answer; and (3) choosing the appropriate answer from a list of available answers. In instances where a feedback rating question does not pertain to a particular transaction, the user may answer not applicable. For example, if there were no items returned during a particular transaction, the user would answer not applicable to questions concerning how well the seller handled item returns. In one embodiment, in addition to the above subjective answers, the questions may elicit objective answers such as "What date was the item received?" which may be processed to estimate an average shipping time. Other questions that may elicit objective answers include "Did you have a problem with the transaction?", "Was a return asked for?", "How many communications did you have with the buyer?", "What payment method was used?" and so on.

Operation 336: Collect Feedback Information Automatically From Local or Remote System In this operation, performance data is collected from one or more local or remote system. Such a system may provide payment applications (e.g., the payment application 32 shown in FIG. 1) may provide objective information or data that is automatically obtained. For example, an actual date of dispatch or payment for a listing may be obtained from third party (e.g., a financial institution, PayPal, or the like).

Operation 340: Submitting and Storing Answers

In this operation, the user submits the completed feedback rating form via feedback leaving client 110, which transmits the raw feedback data to OLTP Web site host 130 via network 120. OLTP application server 134 receives the rating form and stores the feedback rating details in a feedback history table stored in "Feedback Detail History" 280 within enhanced feedback database structure 200. Feedback rating details include the buyer's identity, the seller's identity, the item or service involved in the transaction, and the date of the transaction.

Operation 345: Calculating Seller Feedback Scores

In this operation, OLTP application server 134 retrieves the seller's feedback rating information from "Feedback Detail History" 280 within enhanced feedback database structure 200 and calculates seller feedback scores based on the feedback ratings provided in operation 335 and feedback information automatically collected from a local or remote system (see operation 336). In particular, OLTP application server 134 calculates an aggregate feedback score for the seller, as well as a feedback score for individual performance categories (e.g., shipment time, accuracy of description, communication time, etc.). In one exemplary embodiment, performance category scores may be ratings and/or actual data that may be manually or automatically collected, for example, ship time: average of 3.1 days, shipment on time: 99 positive (99%), and so on. The overall feedback score for both buyer and seller may be calculated based on total positive feedback, total negative as well as distinct positives and negatives based on distinct users and data collected. The feedback score for detailed performance categories may be calculated based on total positives and total negatives vs. overall totals for that category. OLTP application server 134 stores to "Feedback Score" 250 the rating scores in a feedback rating table, which contains a record for each seller, with each record including multiple data fields that contain the seller's aggregate and performance category feedback scores.

In one exemplary embodiment, feedback score may be weighed differently for individual performance categories according to the type of a performance category. For example, feedback score associated with the shipment time may be attributed more weight than feedback score associated with the accuracy of description or communication time, and vise versa. In a further exemplary embodiment of the present invention, a feedback viewing user may be presented with a selection of methods to calculate overall feedback score based on the importance the feedback viewing user places on particular types of performance categories. For example, an interface may be provided to the feedback viewing user to allow the feedback viewing user to indicate the order of importance associated with performance categories (e.g., from the most important performance category to the least important performance category). The order of importance associated with performance categories may be utilized to calculate the overall feedback score for the seller.

Operation 350: Calculating Buyer Feedback-Left Score

In this operation, OLTP database server 136 calculates an aggregate "feedback-left" score for the buyer and stores this score within a feedback-left score table in "Feedback Left Score" 260 within enhanced feedback database structure 200. "Feedback Left Score" 260 contains a record for each buyer, with each record including a data field that contains the buyer's aggregate feedback-left score. Feedback-left scores are calculated as averages of the number of positive, negative, neutral, or not applicable ratings the buyer has given over the course of time as he/she provides feedback on sellers. This feedback-left score is used to gauge a buyer's overall mode of feedback, e.g., the buyer's feedback tendency to give high, medium or low feedback scores. Seller feedback scores may be adjusted according to the buyer's overall feedback mode. While viewing the feedback, the viewer may be able to see the overall tendency of the person leaving feedback, which may be termed as feedback quality information. For example, if a person always leaves negative feedback to everyone, then there could be an unhappy face icon associated with that person in the feedback detail view. To more accurately reflect the buyer's mode of feedback, feedback-left ratings may begin to be calculated after a buyer has provided feedback with respect to a minimum number of transactions. Method 300 proceeds to operation 380.

Operation 355: Retrieving List of Seller Questions by Category

In this operation, OLTP application server 134 retrieves one or more of seller feedback rating questions pertaining to the transactions selected in operation 320. The questions are retrieved from "List Of Seller Questions Based On Item Transaction Category" 240 within enhanced feedback database structure 200. The list of seller feedback rating questions is transmitted as a form to feedback leaving client 110 via network 120, where it is presented to the user. The presented feedback questions may differ depending on the item type (e.g., product or service) involved in the selected transaction. However, some feedback rating questions may remain the same across all item types, e.g., questions concerning the speed at which the buyer paid for an item.

TABLE 2

Exemplary seller feedback rating performance categories and questions for a seller in an OLTP environment.

| Performance Category | Example Questions |
| --- | --- |
| Communication | Does buyer communicate quickly and clearly? |
| Payment | Does buyer pay promptly? |
| | Is the payment amount accurate and as expected (including shipping/insurance/taxes)? |

The feedback rating form presents feedback rating questions to the user grouped according to performance categories. That is, the user may be presented, for example, with three questions regarding the speed at which the buyer paid for an item and four questions regarding how quickly the buyer responded to communications. Table 2 shows a listing of exemplary feedback rating performance categories and questions for the seller. The form may also provide a comment field that enables the seller to enter a customized message regarding the buyer or choose a message from a list of prepared messages.

Operation 360: Entering Answers to Questions

In this operation, the user via feedback leaving client 110 answers the questions posed on the feedback rating form displayed in operation 355. User answers to feedback rating questions typically take the form of positive, negative, neutral, or not applicable. To each of the example questions shown in Table 2, the seller may answer yes, no, neutral, or not applicable. Examples of methods the user might use to select the appropriate answer include: (1) entering a number that corresponds to the appropriate answer; (2) choosing a radio button that corresponds to the appropriate answer; and (3) choosing the appropriate answer from a list of available answers. In instances where a feedback rating question does not pertain to a particular transaction, the user may answer not applicable. For example, if there were no communications for a particular transaction, the user would answer not applicable to questions concerning how clearly the buyer communicated.

Operation 361: Entering Answers to Questions

In this operation, performance data is collected from one or more local or remote system. Operation 361 may corresponds to operation 336 but on a seller side as opposed to a buyer side.

Operation 365: Submitting and Storing Answers

In this operation, the user submits the completed feedback rating form via feedback leaving client 110, which transmits the raw feedback data to OLTP Web site host 130 via network 120, which receives the rating form and stores the feedback rating details in Feedback_Detail_History_Overall 270 within enhanced feedback database structure 200. Feedback rating details include the seller's identity, the buyer's identity, the item or service involved in the transaction, and the date of the transaction.

Operation 370: Calculating Buyer Feedback Scores

In this operation, OLTP application server 134 retrieves the buyer's feedback rating information from Feedback_Detail_History_Overall 270 within enhanced feedback database structure 200 and calculates buyer feedback scores based on the feedback ratings provided in operation 360 and transaction data automatically collected remotely or locally by the system. OLTP application server 134 calculates an aggregate feedback score for the buyer, as well as a feedback score for individual performance categories (e.g., payment time and communication time). As in the case of the buyer side, performance category scores may be ratings and/or actual data that may be manually or automatically collected, for example, ship time: average of 3.1 days, shipment on time: 99 positive (99%), and so on. The overall feedback score for both buyer and seller are calculated based on total positive feedback, total negative as well as distinct positives and negatives based from distinct users. The feedback score for detailed performance categories are calculated based on total positives and total negatives vs. overall totals for that category. OLTP application server 134 stores to Feedback_Score 250 the rating scores in a feedback rating table, which contains a single record for each buyer, with each record including multiple data fields that contain the buyer's aggregate and performance category feedback scores.

In one exemplary embodiment, feedback score may be weighed differently for individual performance categories according to the type of a performance category. For example, feedback score associated with the payment time may be attributed more weight than feedback score associated with the communication time, and vise versa. In a further exemplary embodiment of the present invention, a feedback viewing user may be presented with a selection of methods to calculate overall feedback score based on the importance the user places on particular types of performance categories. For example, an interface may be provided to the feedback viewing user to allow the feedback viewing user to indicate the order of importance associated with performance categories (e.g., from the most important performance category to the least important performance category). The order of importance associated with performance categories may be utilized by the OLTP system 10 to calculate the overall feedback score for the buyer.

Operation 375: Calculating Seller Feedback-Left Score

In this operation, OLTP database server 136 calculates an aggregate "feedback-left" score for the seller and stores this score within Feedback_Left_Score 260 within enhanced feedback database structure 200. Feedback_Left_Score 260 contains a record for each seller, with each record including a data field that contains the seller's aggregates feedback-left score. Feedback-left scores are calculated as averages of the number of positive, negative, neutral, or not applicable ratings the seller has given over the course of time as he/she provides feedback on buyers. This feedback-left score helps to gauge a seller's overall mode of feedback, e.g., the seller's feedback tendency to give high, medium or low feedback scores. Buyer feedback scores may be adjusted according to the seller's overall feedback mode. To more accurately reflect the seller's mode of feedback, feedback-left ratings may not begin to be calculated until a seller has made a minimum number of feedback ratings.

Operation 380: Rate More Transactions?

In this decision operation, OLTP application server 134 transmits a prompt form to feedback leaving client 110 via network 120 for display to the user. The form prompts the user as to whether he or she would like to select any additional transactions from the transaction list displayed in operation 315. If the user responds yes, method 300 returns to operation 315; if no, method 300 ends.

Figure 6:
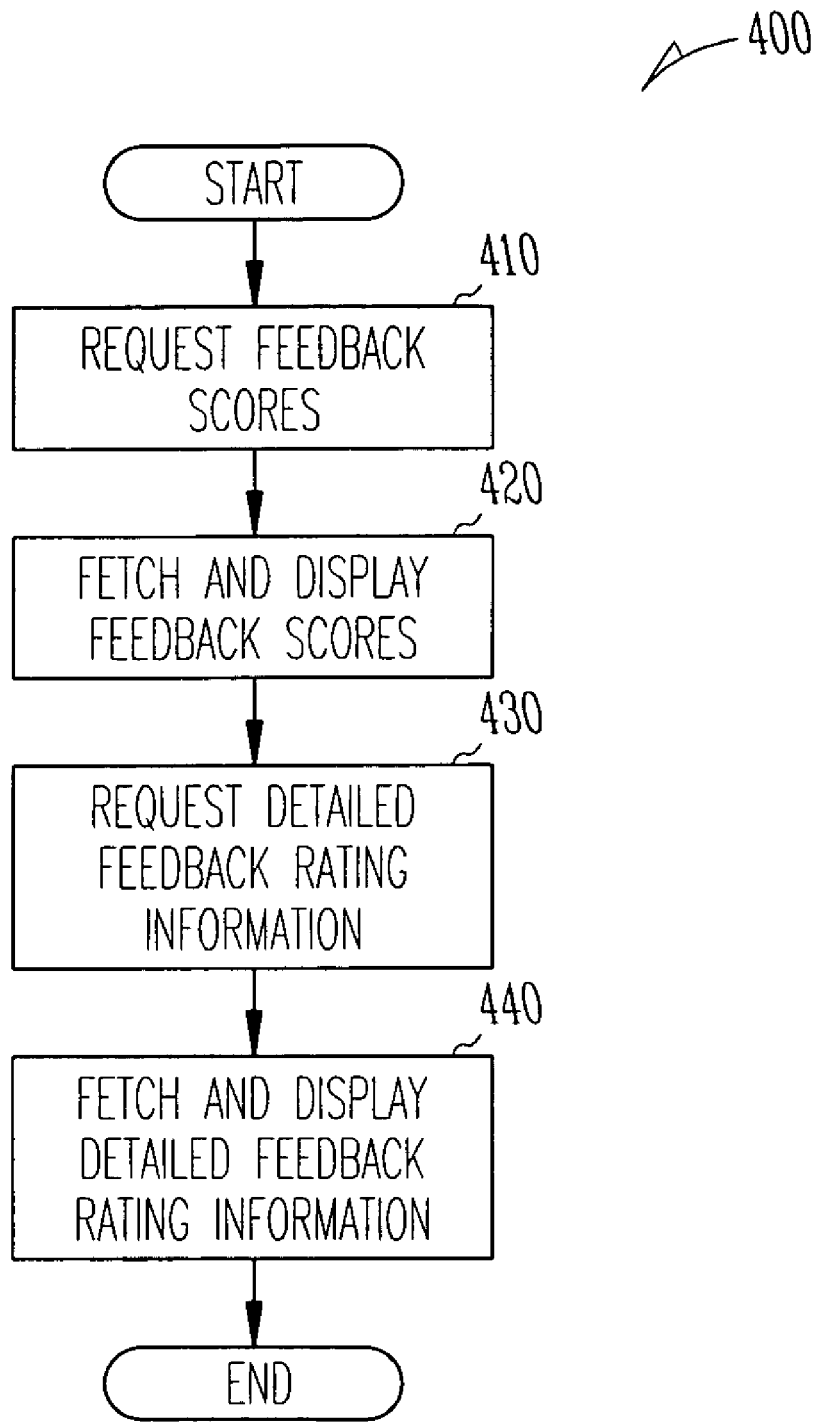
FIG. 6 is a flow chart illustrating a method of requesting, retrieving and presenting transaction performance ratings according to one exemplary embodiment of the present invention.

FIG. 6 illustrates a method 400 of requesting, retrieving and presenting transaction performance ratings, including the operations of:

Operation 410: Requesting Feedback Scores

In this operation, the user, via feedback viewing client 112, requests one of the following: (1) a specific buyer's or seller's aggregate feedback rating; or (2) feedback scores for individual performance categories (e.g., shipment time, accuracy of description, communication time, payment time, etc.) for a specific buyer or seller. Feedback viewing client 112 transmits the request via network 120 to OLTP Web site host 130, where OLTP application server 134 receives it.

Operation 420: Fetching and Displaying Feedback Scores

In this operation, OLTP application server 134 retrieves the feedback scores from the feedback rating table generated at operations 345 and 370 from Feedback_Score 250 within enhanced feedback database structure 200 according to the request made in operation 410, The feedback scores are transmitted to the feedback viewing client 112 via network 120 for display to the user in accordance with user-defined preferences for displayed groups or a default display.

OLTP application server 134 retrieves user preferences from User_Preferences 210 within enhanced feedback database structure 200 upon user login. An example of a user-defined display preference is the directive to display only aggregate feedback ratings and shipping time feedback ratings. When the user desires to view detailed feedback ratings not included in his/her defined preferences or the default display, he/she may activate available hyperlinks to display this detailed data, as described below in operation 430. Examples of feedback scores that may be fetched in this operation include the buyer's speed of payment and the seller's speed of shipment. OLTP application server 134 transmits the feedback scores to feedback viewing client 112 via network 120 for display to the user.

Operation 430: Requesting Detailed Feedback Rating Information

In this operation, the user, via feedback viewing client 112, requests detailed feedback rating information within a particular performance group for a specific buyer or seller based on the presentation of preferred rating information displayed in operation 420. In the absence of the user preferences, default preferences are used. Detailed feedback rating information is the feedback data, which may be stored in Feedback_Detail_History_Overall 270 in operations 340 and 365, and from which the user's feedback score was calculated in operation 345 and operation 370. For example, a user may request to see a seller's aggregate shipping score and then request the feedback data from which that score was calculated. The user's request is transmitted from feedback viewing client 112 to OLTP application server 134 via network 120.

Operation 440: Fetching and Displaying Detailed Feedback Rating Information

In this operation, OLTP application server 134 retrieves the detailed feedback rating information requested in operation 430 from Feedback_Detail_History_Overall 270. OLTP application server 134 transmits the detailed feedback scores to feedback viewing client 112 via network 120 for display to the user.

Figure 7:
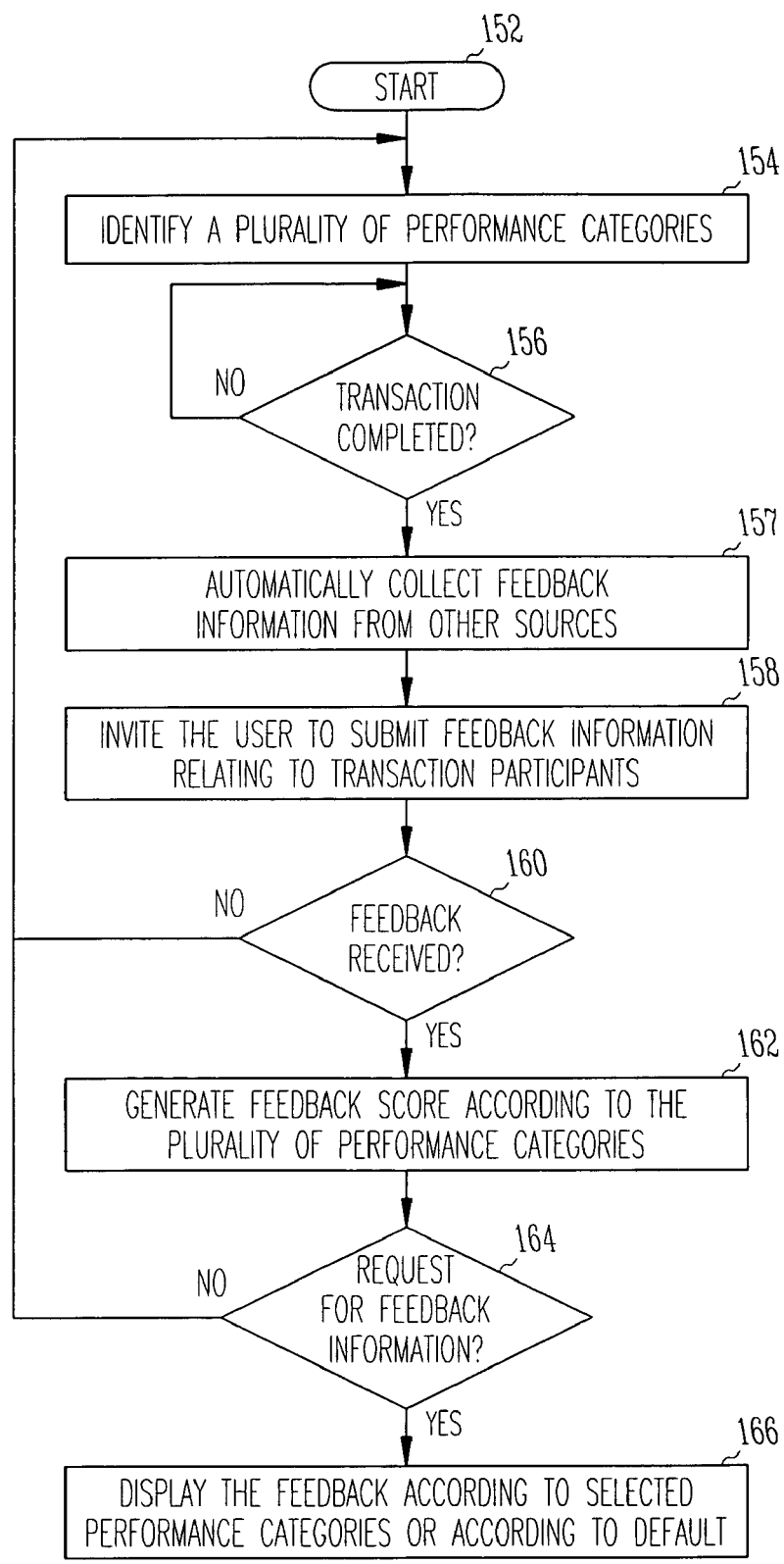
FIG. 7 is a flow chart illustrating a method of collecting and displaying enhanced feedback information according to one exemplary embodiment of the present invention.

FIG. 7 is a flow chart illustrating a method of collecting and displaying enhanced feedback information according to one exemplary embodiment of the present invention. Referring to FIG. 7, OLTP application server 134 identifies a transaction in an OLTP environment when the method commences at operation 152, for example, a purchase of goods between a buyer and a seller. A plurality of performance categories is identified at operation 154. The performance categories may include promptness of communication, promptness of payment, accuracy of description, and other performance categories. At operation 156, the method determines whether the transaction was completed. In one exemplary embodiment, the plurality of performance categories may be identified after the completion of the transaction was detected. Responsive to the completion of the transaction, at operation 158, a participant in the completed transaction, e.g., a buyer or a seller, is invited to submit feedback regarding the completed transaction according to a plurality of performance categories. The feedback may be received in the form of answers to the questions presented by the OLTP application server 134. After one or more participants in the transaction submit feedback regarding the completed transaction, the transaction feedback information is collected and stored in an OLTP database. At operation 157, feedback data or information is automatically collected and stored in the OLTP database 137 before submission of feedback by the participants. Thus, in these circumstances, the system 10 we may know for example that the buyer has paid for a listing in view of the information received from a payment application (e.g., the system may get the information from PayPal) before the seller or buyer has left feedback. This would allow the display of payment related performance data when soliciting answers to questions. If it is determined, at operation 160, that feedback information has been received, feedback score is generated at operation 162.

The feedback information may contain responses to detailed and specific questions provided by the OLTP application server 134 or automatically collected data. In one exemplary embodiment, the responses to detailed and specific questions may be parsed and grouped according to the predefined performance categories. Such grouping may be utilized for formulating feedback score in relation to a particular aspect of a transaction, in addition to the predefined performance categories, such as "promptness of payment and quality of goods or services". This information may also be grouped into categories for the purpose of enabling a user to request and view feedback information according to a specific performance category.

When a user requests to access feedback information at operation 164, the feedback information is displayed at operation 166. In one exemplary embodiment of the present invention, a user may be presented with a selection of one or more specific categories of feedback information (e.g., overall rating of the transaction, promptness of payment by the buyer, promptness of shipment by the seller, etc.). If the user selected one or more specific categories of feedback information, the information may be presented to the user according to the selection. The OLTP application server 134 may be configured to provide a default display of feedback information if the user does not wish to select a particular category of feedback information. The default display may include, for example, overall satisfaction with the transaction score.

Figure 8:
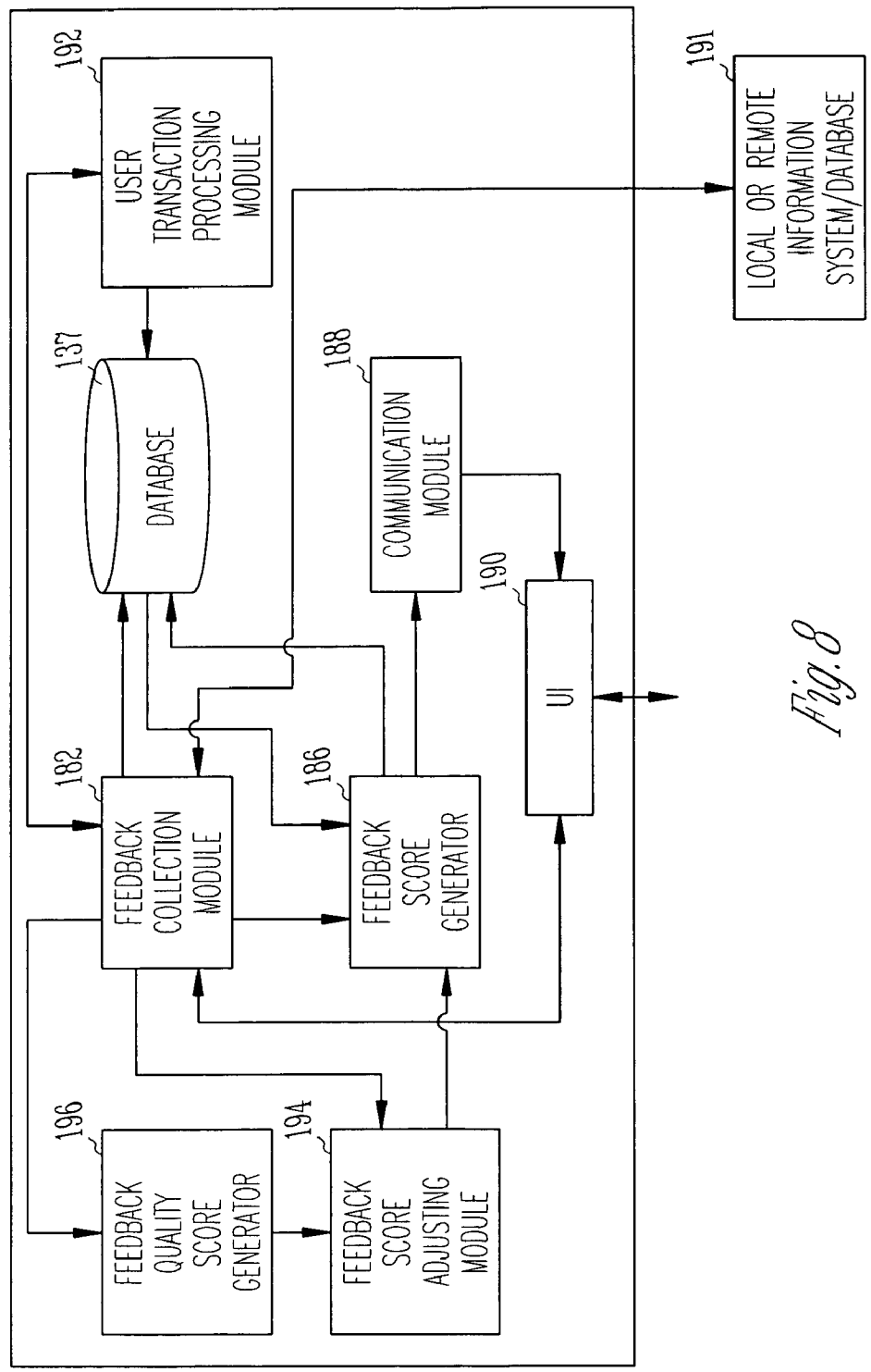
FIG. 8 is a block diagram illustrating a system to collect and display enhanced feedback information according to one exemplary embodiment of the present invention.

FIG. 8 illustrates a block diagram illustrating a system 180 to collect and display enhanced feedback information according to one exemplary embodiment of the present invention. The system 180 may include components of the reputation applications 50. The system 180 includes a feedback collection module 182, a feedback score generator 186, a feedback communication module 188, the database 137, a user interface (UI) 190, a user transaction processing module 192, a feedback score adjusting module 194, and feedback quality score generator 196. In certain embodiments, the system includes a data system 191 that automatically provides feedback information to the feedback collection module 182. The data system 191 may be located locally (e.g., on-site or be part of the system 180) or be remotely located and communicate with the feedback collection module via a network. In one exemplary embodiment the data system 191 may be a facility such as PayPal that includes one or more payment applications.

The feedback collection module 182 may be utilized to receive feedback information from a user, who was a participant in a transaction and automatically one or more other data systems 191 involved in a transaction. The feedback information may be collected utilizing the UI 190 or automatically/programmatically from the data systems 191. The feedback collection module 182 may communicate the collected feedback information to the database 137, where the feedback information may be stored. The feedback collection module 182 may also retrieve information from the database 137 or from the local and/or remote system 191 or any other remote database. The feedback collection module 182 may communicate with the feedback score generator 186 to provide feedback information to the feedback score generator 186. The feedback score generator 186 generates feedback score utilizing the feedback information received from the feedback collection module 182. The feedback score generator 186 may communicate with the feedback quality score generator 196 and with the feedback score adjusting module 194 to generate feedback score related to more than one transaction.

The user transaction processing module 192 may be utilized to monitor the transactions occurring within the OLTP system 10 and in the remote or local data system 191. The user transaction processing module 192 provide information regarding the completion of a particular transaction to the feedback collection module 182. Information related to the completed transactions may be stored in the database 137.

The feedback communication module 188 may be utilized to allow a user to view feedback information associated with another user.

Although the components of the system 180 are described as individual exemplary modules, the functionality of one or more exemplary modules may be combined in an alternative embodiment of the present invention. For example, the system 180 may be configured such that the functions performed by the feedback quality score generator 196 and the feedback score adjusting module 194 are performed by a single module.

Figure 9:
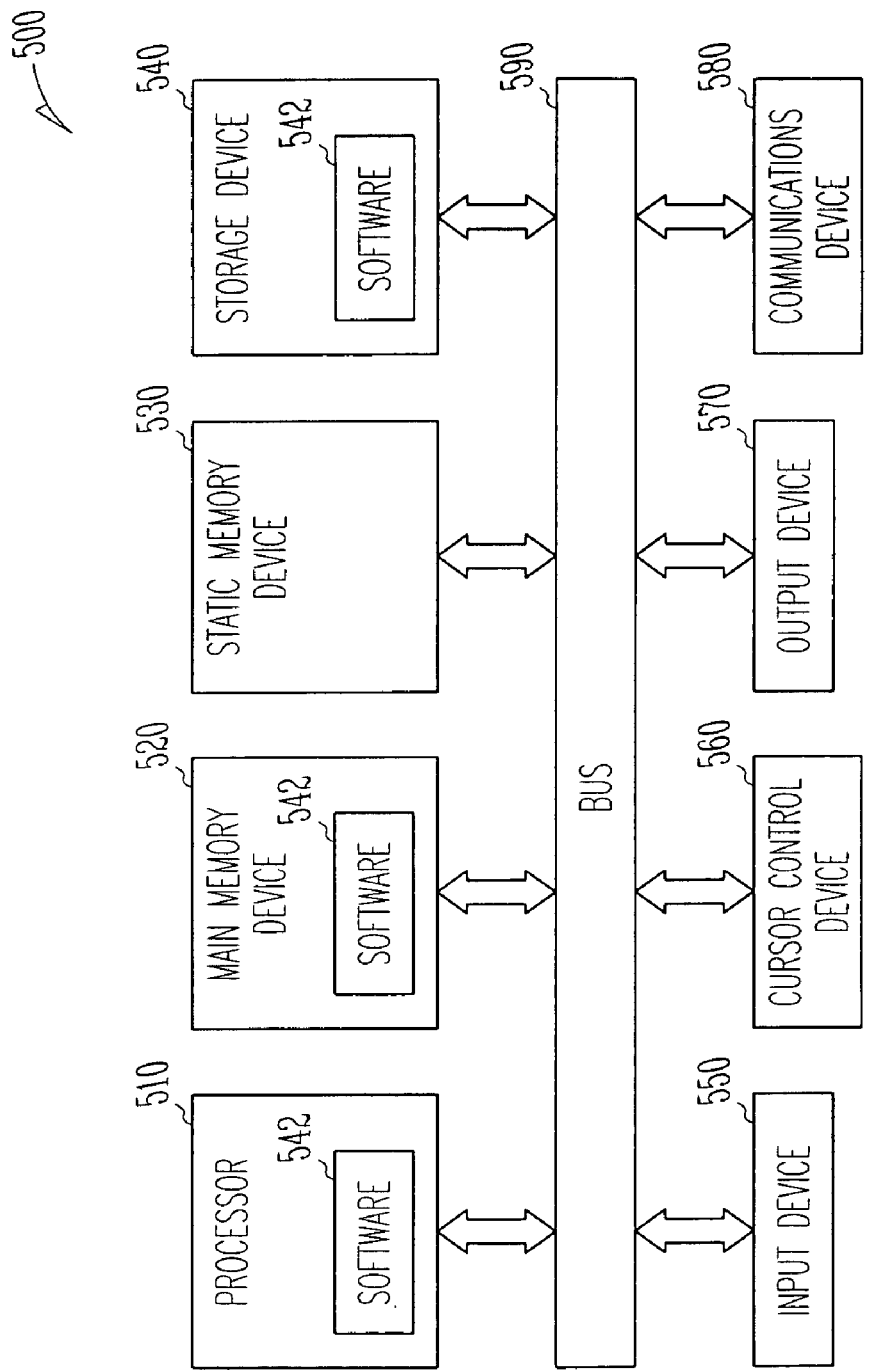
FIG. 9 is a block diagram illustrating a computer system for performing the methods of the present invention according to one exemplary embodiment of the present invention.

FIG. 9 illustrates a computer system 500 within which a set of instructions (e.g., software) may be executed for causing client computers and server computers mentioned above to perform the methods of the present invention.

The computer system 500 includes, a processor 510, a main memory device 520, a static memory device 530, a storage device 540 that further includes software 542, an input device 550, a cursor control device 560, an output device 570 and a communications device 580, all of which communicate with each other via a bus 590 and are connected as shown in the figure. In alternative embodiments, computer system 500 may comprise a network router, a network switch, a network bridge, a personal digital assistant (PDA), a cellular telephone, a Web appliance or any machine capable of executing a sequence of instructions that specify actions to be taken by that machine.

Processor 510 is, for example, a central processing unit (CPU) that processes the instructions of software 542. In an alternative embodiment, multiple processors 510 may be used in a multi-processor configuration. Main memory device 520 is, for example, conventional random access memory (RAM) or other dynamic storage device, and may be used for storing temporary variables or other intermediate information during execution of instructions by processor 510. Static memory 530 is, for example, read only memory (ROM) or other static storage device for storing static information and instructions for processor 510.

Storage device 540 is, for example, a hard disk drive, a floppy disk drive, or a compact disk drive that includes a machine-readable medium on which is stored software 542 embodying any one, or all, of the methods of the present invention.

Software 542 is also shown to reside, completely or at least partially, within main memory device 520 and/or within processor 510. Software 542 may be installed from a machine-readable medium, such as a floppy disk, a CD-ROM, and a DVD, and may further be transmitted or received via a communications device 580. The term "machine-readable medium" may include any medium that is capable of storing or encoding a sequence of instructions for execution by processor 510 and that cause computer system 500 to perform any one of the methods of the present invention. The term "machine-readable medium" may also include solid-state memories and optical and magnetic disks.

Computer system 500 has processing power (e.g., processor 510), memory capacity (e.g., memory device 520), and storage capacity (e.g., storage device 530) sufficient to run software 532 that embodies the operations of the methods of the present invention.

Input device 550 is a device capable of inputting data into computer system 500, such as a keyboard that includes alphanumeric and other keys. Cursor control device 560 is, for example, a mouse, a trackball, or cursor direction keys for communicating direction information and command selections to processor 510 and for controlling cursor movement on output device 570. Output device 570 is a device capable of outputting data from computer system 500, such as a video monitor or printer. Communications device 580 is, for example, a modem or a network adapter that enables and controls the exchange of data between computer system 500 and an external network (not shown), such as an intranet or the Internet. Bus 590 is a communication mechanism for communicating information via transmission media such as coaxial cables, copper wire and fiber optics. Transmission media may also take the form of electromagnetic or acoustic waves, such as those generated during radio and infrared data communications. Bus 590 enables information to be communicated among the various elements of computer system 500 to which it is connected.

In an exemplary operation, the methods of the present invention are provided by computer system 500 in response to processor 510 executing software 542 in main memory device 520. Software 542 may be read in from storage device 540. Execution by processor 510 of the sequences of instructions of software 542 in main memory device 520 causes processor 510 to perform the operations of the methods of the present invention. In response to output from output device 570, a user may input data via input device 550 and control the cursor position via cursor control device 560. Communications device 580 controls the exchange of data with any externally connected network, while bus 590 communicates data among the elements of computer system 500 to which it is connected.

In alternative embodiments, hard-wired circuitry may be used in place of or in combination with software instructions to implement the invention. Thus, embodiments of the invention are not limited to any specific combination of hardware circuitry and software.

Thus, method and apparatus for providing and displaying enhanced feedback in an online transaction processing environment has been described. Although the present invention has been described with reference to specific exemplary embodiments, it will be evident that various modifications and changes may be made to these embodiments without departing from the broader scope and spirit of the invention. Accordingly, the specification and drawings are to be regarded in an illustrative rather than a restrictive sense.

What is claimed is:

1. A system to facilitate computer-based commerce, the system including:
   one or more processors to execute one or more modules, the one or more modules including:
   a user transaction processing module to identify a plurality of transactions for a first user;
   a feedback collection module to receive transaction feedback information for the plurality of transactions from the first user and from an information system, the transaction feedback information being related to performance categories including accuracy of description;
   a feedback score generator to generate a feedback score utilizing the transaction feedback information;
   a feedback quality score generator to generate a feedback quality score measuring a quality of the transaction feedback information for the plurality of transactions received from the first user the feedback quality score being lowered if a number of negative ratings respectively associated with the plurality of transactions is below a predetermined threshold; and
   a feedback score adjusting module to adjust the feedback score generated based on the transaction feedback information, the feedback score adjusting module to utilize the feedback quality score.

2. The system of claim 1, wherein the feedback collection module is to receive transaction feedback information that includes generic feedback information that is related to the transaction.

3. The system of claim 1, wherein the plurality of transactions includes a transaction and wherein the feedback collection module is to receive transaction feedback information that includes specific transaction feedback information that is related to the transaction and related to a first category of a plurality of performance categories.

4. The system of claim 1, wherein the user transaction processing module is to identify the transaction feedback information for each transaction of the plurality of transactions as selected from a group including a subjective criteria and an objective criteria, the feedback quality score generator to generate the feedback quality score for the first user utilizing the transaction feedback information respectively associated with each transaction of the plurality of transactions.

5. The system of claim 3, wherein the feedback score generator is to generate a transaction feedback score according to the transaction feedback information associated with the transaction.

6. The system of claim 3, wherein the feedback score generator is to generate a category feedback score utilizing transaction feedback information associated with a first performance category from the plurality of performance categories.

7. The system of claim 1, wherein the feedback score generator is to:
access reputation information associated with the first user, wherein the reputation information is associated with the plurality of transactions for the first user; and
generate overall feedback score utilizing the reputation information.

8. The system of claim 1, wherein the feedback collection module is to:
identify a user status, the user status selected from a group including a buyer status and a seller status;
generate at least one question according to the user status;
publish the at least one question to the first user; and
receive from the first user at least one answer to the at least one question.

9. The system of claim 3, wherein the feedback collection module is to:
receive from the first user a selection of at least one category from the plurality of performance categories; and
display the feedback score utilizing the selection.

10. The system of claim 3, wherein the plurality of performance categories is selected from a group including promptness of payment information, quality of performance information, timeliness of performance information, promptness of response information, and shipment time.

11. The system of claim 1, wherein the plurality of transactions includes a transaction and wherein the transaction feedback information is selected from a group including an identity of a seller, an identity of a buyer, an item or a service involved in the transaction, and a date of the transaction.

12. The system of claim 1, wherein the feedback collection module is to receive additional transaction feedback information from a third-party information system via a network.

13. A method including:
via one or more processors,
identifying a plurality of transactions for a first user;
receiving transaction feedback information for the plurality of transactions from the first user and from an information system, the transaction feedback information being related to performance categories including accuracy of description;
generating a feedback score utilizing the transaction feedback information;
generating a feedback quality score measuring a quality of the transaction feedback information for the plurality of transactions received from the first user;
lowering the feedback quality score when a number of negative ratings respectively associated with the plurality of transactions is below a predetermined threshold; and
adjusting the feedback score generated based on the transaction feedback information, the adjusting utilizing the feedback quality score.

14. The method of claim 13, wherein the plurality of transactions includes a transaction and wherein the receiving of the transaction feedback information includes receiving generic feedback information related to the transaction.

15. The method of claim 13, wherein the transaction feedback information relates to a plurality of performance categories and wherein the plurality of transactions includes a transaction and wherein the receiving of the transaction feedback information includes receiving category feedback information related to the transaction and a first category of the plurality of performance categories.

16. The method of claim 14, wherein the generating of the feedback score includes generating a transaction feedback score utilizing the generic feedback information.

17. The method of claim 15, wherein the generating of the feedback score includes generating a category feedback score utilizing the category feedback information.

18. The method of claim 13, wherein the generating of the feedback score includes:
accessing reputation information associated with the first user, wherein the reputation information is associated with the plurality of transactions for the first user; and
generating overall feedback score utilizing the reputation information associated with the first user.

19. The method of claim 13, wherein the receiving of the transaction feedback information from the first user includes:
identifying a user status associated with the first user, the user status selected from the group including a buyer status and a seller status;
generating at least one question according to the user status;
publishing the at least one question to the first user; and
receiving from the first user at least one answer to the at least one question.

20. The method of claim 13, further including enabling of a second user to access the transaction feedback information, wherein the enabling includes:
identifying user preferences for the second user; and
facilitating displaying the feedback score according to the user preferences.

21. The method of claim 15, wherein the plurality of performance categories is selected from a group including promptness of payment information, quality of performance information, timeliness of performance information, promptness of response information, and shipment time.

22. The method of claim 15, wherein the transaction feedback information is selected from a group including a seller's identity, a buyer's identity, an item or a service involved in the transaction, and a date of the transaction.

23. A machine-readable medium embodying a sequence of instructions that, when executed by a machine, cause the machine to:
identify a plurality of transactions for a first user;
receive transaction feedback information for the plurality of transactions from the first user and from an information system, the transaction feedback information being related to performance categories including accuracy of description;
generate a feedback score utilizing the transaction feedback information;
generate a feedback quality score measuring a quality of the transaction feedback information for the plurality of transactions received from the first user;
lower the feedback quality score when a number of negative ratings respectively associated with the plurality of transactions is below a predetermined threshold; and
adjust the feedback score generated based on the transaction feedback information, the adjusting utilizing the feedback quality score.

24. A system to facilitate computer-based commerce, the system including:
one or more processors to execute one or more modules, the one or more modules including:
a first means for identifying a plurality of transactions for a first user;
a second means for receiving transaction feedback information for the plurality of transactions from the first user and from an information system, the transaction feedback information being related to performance categories including accuracy of description;

a third means for generating a feedback score using the transaction feedback information;

a fourth means for generating a feedback quality score measuring a quality of the transaction feedback information for the plurality of transactions received from the first user;

a fifth means for lowering the feedback quality score when a number of negative ratings respectively associated with the plurality of transactions is below a predetermined threshold; and a sixth means for adjusting the feedback score generated based on the transaction feedback information, the adjusting utilizing the feedback quality score.

* * * * *